(12) United States Patent
James et al.

(10) Patent No.: US 6,306,811 B1
(45) Date of Patent: Oct. 23, 2001

(54) COMPOSITIONS CONTAINING SODIUM PERCARBONATE

(75) Inventors: Alun P. James, Liverpool; Graham R. Horne, Warrington, both of (GB); Richard Roesler, Kraainem (BE); Soraya Parvaneh, Leghorn (IT); Romano Pardini, I-Rosignano-Solvay (IT); Pier-Luigi Deli, Genoa (IT)

(73) Assignee: Solvay Interox (BE)

( * ) Notice: Subject to any disclaimer, the term of this patent is extended or adjusted under 35 U.S.C. 154(b) by 0 days.

(21) Appl. No.: 09/142,941

(22) PCT Filed: Mar. 27, 1997

(86) PCT No.: PCT/EP97/01563

§ 371 Date: Mar. 30, 1999

§ 102(e) Date: Mar. 30, 1999

(87) PCT Pub. No.: WO97/35951

PCT Pub. Date: Oct. 2, 1997

(30) Foreign Application Priority Data

Mar. 27, 1996 (GB) .................................................. 9606427
Mar. 26, 1997 (IT) .............................................. MI97A0711

(51) Int. Cl.⁷ ............................... C11D 3/00; C11D 7/18; C11D 7/54; A62D 3/00; C01B 31/00
(52) U.S. Cl. .................... 510/309; 510/367; 252/186.27; 423/415.2
(58) Field of Search .................................... 510/302, 309, 510/315, 367, 375, 377, 507, 531, 532, 534; 423/415.2; 73/73, 74, 865.5; 252/186.27

(56) References Cited

U.S. PATENT DOCUMENTS

| | | | | |
|---|---|---|---|---|
| 2,152,520 | * | 3/1939 | Lind ........................................ | 252/99 |
| 4,325,933 | * | 4/1982 | Matsumoto et al. .............. | 423/415 P |
| 4,388,287 | * | 6/1983 | Sugano et al. ..................... | 423/415 P |
| 4,526,698 | * | 7/1985 | Kuroda et al. ......................... | 252/99 |
| 4,604,224 | * | 8/1986 | Cheng ..................................... | 252/91 |
| 5,219,549 | * | 6/1993 | Onda et al. ........................ | 423/415 P |
| 5,238,594 | * | 8/1993 | Chapple ................................. | 252/95 |
| 5,258,133 | * | 11/1993 | Chapple ................................. | 252/95 |
| 5,312,557 | * | 5/1994 | Onda et al. ............................. | 252/99 |
| 5,332,518 | * | 7/1994 | Kuroda et al. ......................... | 252/99 |
| 5,340,496 | * | 8/1994 | Sato et al. ........................ | 252/186.27 |
| 5,603,911 | * | 2/1997 | Korvela et al. ....................... | 423/266 |
| 5,665,427 | * | 9/1997 | Horne et al. .......................... | 427/212 |
| 5,690,701 | * | 11/1997 | Bigini et al. ....................... | 23/302 R |
| 5,773,401 | * | 6/1998 | Murata et al. ........................ | 510/361 |
| 5,851,420 | * | 12/1998 | Kim et al. ........................ | 252/186.27 |

FOREIGN PATENT DOCUMENTS 2 226 463   11/1974   (FR) .

\* cited by examiner

*Primary Examiner*—Yogendra Gupta
*Assistant Examiner*—John M. Petruncio
(74) *Attorney, Agent, or Firm*—Larson & Taylor, PLC

(57) ABSTRACT

Sodium percarbonate exhibits a tendency to decompose in built compositions and particularly detergent compositions built with zeolites. The tendency can be ameliorated by selecting sodium percarbonate which intrinsically has a mean particle size of from 500 to 1000 microns and not more than 20% by weight of below 350 microns and has a moisture pick-up when measured in a test at 80% relative humidity and 32° C. after 24 hours of not greater than 30 g/1000 g sample. A suitable sodium percarbonate can be made most conveniently by crystallisation from a bulk saturated solution of sodium percarbonate in a crystalliser/classifier that does not employ a conventional chloride salting-out agent.

20 Claims, No Drawings

COMPOSITIONS CONTAINING SODIUM PERCARBONATE

This invention concerns sodium percarbonate and compositions containing it, especially detergent compositions which contain additionally a constituent thereof which interacts destructively with sodium percarbonate.

Detergent compositions, and specifically particulate detergent compositions intended for general purpose household fabric washing or for specialist uses such as nappy sanitisation or dishwashing often contain in addition to one or more surfactants, a builder, a bleach and optionally fillers/processing aids and minor amounts of a number of other adjuvants including one or more chosen from an optical bleach, complexing agents, perfumes, and colours. Traditionally, the builder was selected from inorganic phosphates such as sodium tripolyphosphate in view of the beneficial properties of phosphates in fabric washing, but phosphates have been shown to cause or contribute to eutrophication, and one source of phosphates is the effluent from domestic or industrial fabric washing. Consequently, and in response to increasingly stringent legislation in various countries, the detergents industry in more recent years has sought alternatives to phosphates, of which one very important class of replacement builders comprises zeolites.

The bleach constituent usually comprises a peroxygen compound, of which one favoured example comprises sodium carbonate peroxyhydrate in view of its solubility and other characteristics. This compound has commonly been called sodium percarbonate, and is so referred herein. However, sodium percarbonate can interact destructively with other detergent constituents resulting in progressive decomposition of the percarbonate and hence its loss of bleaching power during storage and transportation of the composition and the problem is especially evident when the detergent builder comprises zeolites.

A number of proposals have been made to overcome or ameliorate the problem of sodium percarbonate decomposition in zeolite-built detergent compositions. In general, the proposals relate to two methods. In one method, as exemplified by EP-A-0451893 to Unilever, a particle size distribution of the sodium percarbonate is selected in accordance with a given formula. In effect, the formula favours a mean particle size of at least 400 microns and a narrow particle distribution. Such a method employs simply the gross external dimensions of the percarbonate to indicate which are superior and which are inferior particles to employ. However, sodium percarbonate generally has a porous or irregular outer layer so that the gross dimensions do not directly control the effective surface area of the percarbonate. The regularity and porosity of the external surface of sodium percarbonate varies depending upon its method of manufacture, and this is a further and very important factor which directly affects the effective surface area and the stability of the percarbonate.

A second and frequently described method of improving the stability of sodium percarbonate is to coat the surface of the percarbonate with a surface layer of material which physically interposes itself between the surface of the percarbonate and any other particulate constituents of the composition. The effectiveness of the coating at retarding or ameliorating the rate and extent of percarbonate decomposition depends on the nature of the material employed for the coating and the integrity of the coating. Whilst a number of coating materials have been described which are beneficial in retarding decomposition in zeolite-built detergent compositions, including particularly coatings containing sodium borates in U.S. Pat. No. 4526698 to Kao Soap, these do not teach the reader anything about the inherent stability of the uncoated percarbonate. Likewise, in WO 95/15291 to Kemira, there is described the use of carbon dioxide gas in contact with damp percarbonate during the coating operation to improve the resultant stability of the resultant coated percarbonate. As with the Kao Soap disclosure, this provides no teaching on the stability of the uncoated percarbonate.

The continuing desire to incorporate both zeolites and sodium percarbonate in a detergent composition, and especially in concentrated or ultra-concentrated detergent compositions means that there remains a continuing need to find yet more and/or better ways to improve the stability of percarbonate and/or determine how to select appropriately from the various manufacture methods for sodium percarbonate, the product which exhibits improved or optimised stability.

In addition, however, at least in some parts of the world, a significant fraction of washing compositions or bleach additive compositions are built with a major proportion of non-zeolite builder or even without any zeolite builder, so that it would also be commercially advantageous to improve or optimise the stability of sodium percarbonate incorporated in such compositions too.

It is a first object of at least some aspects of the present invention to provide other and/or improved detergent compositions containing both sodium percarbonate and a zeolite.

It is a further object of the present invention in at least certain other aspects to identify a method of selecting sodium percarbonate which is intrinsically suited for incorporation in built compositions.

According to the present invention, there is provided a detergent composition which contains a zeolitic builder and sodium percarbonate characterised in that the sodium percarbonate intrinsically has a mean particle size of from 500 to 1000 microns and not more than 20% by weight of below 350 microns and has a moisture pick-up when measured in a test conducted in a humidity room at 80% relative humidity and 32° C. after 24 hours of not greater than 30 g/1000 g sample.

Herein, "intrinsically" when employed in conjunction with sodium percarbonate or "intrinsic sodium percarbonate" both indicate dry sodium percarbonate which has been obtained from a crystallisation or other manufacturing process without a subsequent coating or surface treatment that has to interpose a layer of non-sodium percarbonate material between itself and some other constituent of the composition. It will be recognised that the properties of particulate sodium percarbonate can be modified by subsequent treatments, but that it remains advantageous to select as core material, sodium percarbonate that has good stability intrinsically.

According to a further aspect there is provided a process for selecting sodium percarbonate for incorporation in a builder-containing composition characterised by conducting in either order the steps of 1) measuring its particle size distribution, determining its mean particle size and the weight fraction below 350 microns, and rejecting from step 1 material which has a mean particle size outside the range of from 500 to 1000 microns or contains more than 20% by weight of below 350 microns; and 2) measuring the extent to which moisture is picked up by the material in a test conducted for 24 hours at 32C and 80% relative humidity and rejecting material which picks up more than 30 g moisture per 1000 g material, the retained material meeting acceptable standards intrinsically for sodium percarbonate in regard to its particle size and moisture pick-up.

By selecting intrinsic sodium percarbonate which simultaneously has a desirable particle size distribution and a suitable moisture pick-up in the specified tests, it is possible to identify sodium percarbonate which has a superior stability in a built composition such as especially a zeolite-built detergent composition when compared for example with the incorporation of commercially available uncoated percarbonate which meets neither or only one of the selected parameters.

It will be recognised that it is possible to produce and isolate varied sodium percarbonate products having the same or similar particle size distribution, but a widely differing moisture pick-ups by the choice of manufacturing process and by appropriate selection of conditions/operating parameters within the chosen manufacturing process. Such varied products have varying stability to decomposition in a built composition, and especially a zeolite-built detergent composition. Some will be better and some will be worse, and the choice of which sodium percarbonate is better to use can be made by employing the invention twin test method.

Without being bound by any particular theory or belief, it is considered probable that the moisture pick-up as measured by the test is indicative of the extent of irregularity and/or porosity of the sodium percarbonate that is presented to the atmosphere, whereas the particle size distribution is indicative of the physical contact between particulate constituents of the composition and that when taken together rather than individually, the two tests present a clear basis for selecting sodium percarbonate intrinsically having relatively good stability in the presence of zeolite builder, and In fact, in the presence of other builders too.

It is preferable for the sodium percarbonate particles to fall substantially within the range of from 250 to 1250 microns and particularly for at least 80%, and advantageously at least 95%, by weight of the particles to fall in the range of 350 to 1000 microns. It is particularly desirable to employ sodium percarbonate which has a mean particle size of from 550 to 850 microns and in a number of preferred embodiments of from 600 to 800 microns. A product having a mean particle size of at least 600 microns and especially at least 650 microns and a span of from 0.9 to 1.2 will often meet the particle size criteria without further classifying being carried out. From the standpoint of percarbonate stability, it is desirable to avoid or minimise the proportion of relatively small particles, such as particles of below 350 microns and particularly below 250 microns. The relatively large particles such as over 1000 microns diameter do not impair stability, but can segregate from the smaller constituents of the compositions to a greater extent.

The particle size distribution of particulate sodium percarbonate can be determined by a standard method of sieving a representative sample of the material through a nest of sieves of known decreasing aperture, and weighing the fraction of material retained on each sieve. As the number of sieves increases, the accuracy of the measurement increases. In an alternative method of measurement, the particulate product is passed through a beam of light from a laser and the resultant scattered light is analysed, for example using a particle size analyser available under the tradename Malvern 2600 C.

The particle size distributions that are indicated herein can be obtained by one or more of the following methods. Where a crystallisation process is employed, external classification of for example dried percarbonate and/or an integrated internal classifier linked to the crystalliser and classifying the percarbonate particles in a liquid medium can be employed respectively to isolate the required fraction or manufacture a desired range of percarbonate particles. For example, a product having a mean particle size of dried particles within the range of 500 to 700 microns can readily be obtained from a dried product of a conventional "wet" manufacturing process by sieving and excluding substantially all particles below a specified sieve size, such as 350 microns, thereby leaving a fraction that extends typically from 350 to about 850 microns and a peak fraction at around 500 to 600 microns. By sieving to exclude product below a higher sieve size, eg 500$\mu$, it is possible to obtain a product with a higher mean particle size of eg 600 to 700. Alternatively or additionally, particles in excess of an upper size such as 1250 or 1000 microns can be removed so as to leave a narrower range. It will also be recognised that the particle size distribution of product obtained in manufacture processes can be varied by controlling the process parameters. Hence, in a crystallisation process, by controlling the rate of nucleation relative to growth in the crystalliser and avoiding or minimising the introduction of preformed nuclei, it is possible to increase the average particle size of the resultant product.

In a further variation, the particle size distribution of sodium percarbonate having a mean particle size of below 500 $\mu$ can increased to within the desired range by a process of granulation/agglomeration of the particles, typically with the aid of an aqueous solution of a known agglomerating/granulating aid for alkaline materials sprayed onto the percarbonate in conventional apparatus, such as a granulating pan. For example, water-soluble coating agents for sodium percarbonate, such as silicate, can be suitably employed under the process conditions appropriate for granulation to bind the percarbonate particles together rather than simply form a coating.

It is especially preferable to employ crystallised sodium percarbonate which has been produced by a process in which a classifier is integral with the crystalliser, and operated such that particles above and below a desired minimum size are separated out in the classifier, the larger particles are recovered as product whereas the smaller particles are recycled to the crystalliser where they can grow as a result of deposition of additional sodium percarbonate from solution, typically by addition of salting-out agent into saturated or supersaturated sodium percarbonate solution in the crystalliser, and the enlarged particles flow back into the classifier. Such combined classifier/crystallisers are particularly beneficial in that by suitable operational control, it can be possible to control the granulometry of the particles during manufacture rather than having to employ an external and hence additional classification process. The product usually has a particle distribution which is similar to "normal", the spread for which depends on the type of plant employed. It often has a span of from about 0.6 to about 0.9. The product usually displays at least 80% and frequently at least 90% of its particles by weight within the range of +/−50% of the mean particle size, with mean particle size of above 600 to 1000 and in many instances from 650 to 850 microns.

A further process capable of producing sodium percarbonate with the desired particle size range comprises a crystallisation process operated with the ratio of hydrogen peroxide to sodium carbonate kept substoichiometric, and particularly in the range of 0.8–1.2:1, mother liquor on recycle to the crystalliser being less than saturated in carbonate, and the crystallisation being carried out without addition of salting out agent.

Advantageously, the processes that avoid a salting out agent like sodium chloride which is readily co-precipitated with sodium percarbonate, and particularly processes which avoid salting out agent can produce product having a high purity, for example having an Avox of at least 14.5% and in some embodiments an avox of at least 14.8%.

Such crystallisation processes above can naturally be carried out using stabilisers and crystal habit modifiers such as sodium silicate polyphosphonic acids, phosphates and homo or copolyacrylates in the manner recognised by the art, though with heightened benefit when salting out is not employed so that residual concentrations of peroxide can be higher than in chloride-salted processes. In many instances, the resultant product has a smooth round shape which encourages close packing and enables its bulk density to fall the region of 800 to 1100 g/1000 g in a standard free flowing bulk density test.

Alternatively, where for example particulate sodium percarbonate is obtained by evaporating a carrier fluid from a solution of sodium percarbonate, or solutions of the reactants to form in situ sodium percarbonate, that is/are respectively sprayed onto a bed of sodium percarbonate particles, for example fluidised by an updraft of drying inert gas, eg air, the process operation can be continued until the desired particles are obtained having at least a minimum size that provides the mean particle size with at least the broadest range of 500 to 1000 microns. In such a fluidised bed process, it is possible to select operating conditions which reduce or minimise the creation of nuclei by in situ physical disintegration of existing particles in the bed and minimise the introduction of externally produced nuclei, thereby once again promoting the formation of a product having a larger particle size.

A second important characteristic of the sodium percarbonate employed in the invention compositions is the extent/rate at which it picks up moisture from a humid atmosphere. Herein, including specifically in the exemplified and comparison compositions, the capability of the sodium percarbonate to pick up moisture is measured by the following test:

A 9 cm diameter petri dish with a 1 cm depth rim is weighed accurately on a 4 decimal place balance, (W1). A sample of dry sodium percarbonate (about 5 g) is placed on the petri dish which is gently agitated to generate an even particulate layer across the base of the dish and reweighed on the same balance, (W2). The sample on the petri dish is stored in a room, about 3 M high, wide and long in an atmosphere maintained for a period of 24 hours at 32° C. by a thermostat controlled heater and at 80% Relative Humidity (RH) by introduction of a fine droplet water spray under the control of an humidity detector and weighed on the same balance, (W3). The samples are protected by a shield from the spray.

The moisture pick-up of the sodium percarbonate is calculated as follows:

$$\text{Moisture Pick-up (g/kg)} = \frac{1000 \times (W3 - W2)}{(W2 - W1)}$$

Depending on its method of manufacture, the extent of moisture pick-up by sodium percarbonate in the test can vary over a very wide range, from a low figure that is below 10 g/1000 g such as from 1–5 g/1000 g up to a figure that is in the range of from 100 to 200 g/1000 g. Such latter products are outside the scope of the instant invention. Other manufacture methods can generate products having a moisture pick-up of between 15 and 30 g/1000 g in the test. Their use in zeolite compositions is according to the present invention, though the selection of products with lower (ie up to 15 g/100 g) or especially the lowest moisture pick-up are preferred.

It has been found that the extent of moisture pick-up is influenced by which substances, such as salting-out agents, are employed to promote crystallisation of the percarbonate. Traditionally, the most important salting out agent has been sodium chloride, because it is readily available and has been very effective for promoting crystallisation, but it is now found, disadvantageously, that its use tends to promote the extent of moisture pick-up. Consequently, and in order to control the moisture pick-up of intrinsic sodium percarbonate, it is especially desirable that the proportion of sodium chloride in the salting out agent be controlled to provide at most no more than a minor fraction of the sodium (on a molar basis), such as for example not more than 10%. It is particularly desirable to employ an essentially chloride-free salting-out agent, ie at no more than an impurity level. In certain particularly preferred processes for obtaining sodium percarbonate having the desired low moisture pick-up characteristic, sodium sulphate is employed as salting out agent. In other especially suitable processes for producing a product having a low-moisture pick-up, the crystallisation can be carried out in the absence or substantial absence of any added salting out agent, for example by omission of the salting agent from the process described in EP-A-0703190.

It will correspondingly be recognised that if a coating agent is used, at least in part, to granulate intrinsically acceptable sodium percarbonate to increase its mean particle to above 500 $\mu$m, corresponding restrictions on the presence of chloride in the coating agent are desirable.

It will be recognised that it is especially advantageous to the sodium percarbonate manufacturer to employ a manufacturing process for the sodium percarbonate which can be controlled to produce a product having simultaneously a low moisture pick-up and a narrow particle size distribution with a mean in the region of 500 to 1000 microns. Such a manufacturing process employs in combination crystallisation of percarbonate in an integrated crystalliser/classifier as described herein and the use of sodium sulphate or like other non-chloride sodium salt as the salting out agent. Indeed, within the class of especially suitable processes are those in which a salting out agent is omitted.

One type of apparatus, which can advantageously be employed to produce sodium percarbonate having intrinsically acceptable properties, provided that an appropriate choice is made of salting out agent, if any is used, is described in EP-A-703190 to Solvay Interox SA.

The detergent composition of the present invention often contains sodium percarbonate meeting the combination of mean particle size from 500 to 1000 $\mu$ and moisture pickup of not more than 30 g/1000 g in the test in an amount of at least 2% and in many instances at least 5% by weight. It is usually not more than 40% and in many instances up to about 25% by weight of the composition.

It will be recognised that the sodium percarbonate having the aforestated combination of defined particle size and moisture pick-up characteristics can be incorporated as such in the zeolitic or other built detergent composition or optionally it can serve as a convenient and preferred base for coating so as to combine further its inherent stability with that imparted by a coating. The amount of such a coating is selected usually in the range of from 0 to 20% w/w based on the sodium percarbonate and a convenient amount is often selected in the range of from 1 to 5% w/w. It is especially desirable to select the coating material such that it augments rather than undoes the improvement in stability achieved by the inherent sodium percarbonate. In consequence, it is preferable to employ a coating which excludes a soluble halide such as especially sodium chloride from the coating or does not employ more than an acceptable upper amount, such as not more than about 2.5% based on the sodium percarbonate. Subject to the restriction concerning chloride, the coating materials often advantageously comprise one or more materials selected from the following: Alkali metal and/or alkaline earth metal, particularly sodium or soluble magnesium, salts of mineral or other inorganic acids and especially sulphate, carbonate, bicarbonate, phosphate and/or polymeric phosphates, silicates, borates and the corresponding boric acids. The coating can additionally or alternatively include water soluble acids and salts of metal chelating agents such as in the classes of aminoethylenepolycarboxylates and aminoethylenepolymethylenephosphonates, including the well known EDTA, DTPA, EDTMPA and DTPMPA, and/or chelating carboxylic or hydroxycarboxylic acids, such as citrate, tartrate or gluconate. Other constituents can include fatty acids (eg up to C20) and/or the corresponding amides.

Particular combinations of coating agents of note include carbonate/sulphate, and boric acid or borate with sulphate and the combination of a) sulphate, carbonate/sulphate, bicarbonate, boric acid or borate alone or with sulphate, citrate or citrate/sulphate, gluconate or gluconate/sulphate, with b) silicate and/or a carboxylate or phosphonate metal chelating agent.

A wide range of zeolite builders, sometimes alternatively referred to as aluminosilicate builders, can be incorporated in the invention compositions. Suitable zeolites usually demonstrate a substantial calcium (or other alkaline earth metal) (ie water hardness) ion exchange capacity, expressed as $CaCO_3$ equivalent of at least 150 mg $CaCO_3$ per g and for most of the preferred zeolites their hardness exchange capacity of from 200 to about 350 mg $CaCO_3$ equivalent per g.

A number of such zeolites often obey the empirical general formula $M_z[(AlO_2)_z(SiO_2)_y] \cdot xH_2O$ in which M represents an alkali metal, preferably sodium, z and y are both at least 6 and the mole ratio of y:z from 1:1 to 2:1 and x is at least 5 and preferably from 10 to about 280. Many of the zeolites are hydrated, containing up to about 30% by weight of water, such as from about 10 to about 25% water bound within the material. The zeolites can also be amorphous, though a majority of preferred zeolites are crystalline.

Although certain aluminosilicates are naturally occurring, most are synthetic. Suitable named crystalline zeolites of well known structure and formula include zeolite A, zeolite X, Zeolite B, zeolite P, zeolite Y, zeolite HS, and zeolite MAP.

The proportion of zeolite in the composition is often at least 5%, and in many instances at least 10% by weight thereof. it is normally not greater than about 60%, often not greater than 50% and in many instances not more than 40% by weight of the composition.

Zeolite for use in the present invention can be prepared in a way which reduces or minimises subsequent attack on bleach in a composition, such as by control of the moisture content, preferably below equilibrium level, as described for example in WO 95/05445.

It will be understood that, in a modification to the invention, although the instant invention in one aspect is directed primarily at compositions containing one or more zeolite builders in conjunction with the selected percarbonate, a similar benefit in terms of improved percarbonate stability can be observed by selecting the percarbonate in the same way for use in conjunction with amorphous or especially layered silicates to be substituted for the zeolite within the same weight proportions, though on a lesser scale as befits their more benign interaction with percarbonate. Such layered crystalline silicates often obey the empirical formula $Na_2Si_xO_{2x+1} \cdot yH_2O$ or the corresponding compounds in which one sodium ion is replaced by hydrogen, in which x is selected in the range of from 1.9 to 4 and y is selected in the range of from 0 to 20, as for example disclosed in EP-A-164514. In the modification to the invention, such layered silicates are employed in the absence of zeolites.

The detergent compositions of the present invention contain usually one or more surfactants, often present in total in an amount of from 2 to 40%, and particularly 5 to 25% by weight.

The surfactants for incorporation in solid compositions of the present invention can be selected from particulate or flaky anionic, cationic, non-ionic, zwitterionic, amphoteric and ampholytic surfactants and can be either natural soaps or synthetic. A number of suitable surfactants are described in chapter 2 of Synthetic Detergents by A Davidsohn and B M Milwidsky (6th edition) published in 1978 by George Godwin Ltd and John Wiley & Sons, incorporated herein by reference. Without limiting to these surfactants, representative sub-classes of anionic surfactants are carboxylic acid soaps, alkyl aryl sulphonates, olefin sulphonates, linear alkane sulphonates, hydroxy-alkane sulphonates, long chain and OXO alcohol sulphates, sulphated glycerides, sulphated ethers, sulpho-succinates, alkane sulphonates, phosphate esters, sucrose esters and anionic fluorosurfactants; representative classes of cationic surfactants include quaternary ammonium or quaternary pyridinium salts containing at least one hydrophobic alkyl or aralkyl group, representative classes of non-ionic surfactants include condensates of a long chain alkanol with either polyethylene oxides or with phenols, or condensates of long chain carboxylic acids or amines or amides with polyethylene oxide, and related compounds in which the long chain moiety is condensed with an aliphatic polyol such as sorbitol or condensation products of ethylene and propylene oxides or fatty acid alkanolamides and fatty acid amine oxides; representative classes of amphoteric/zwitterionic surfactants include sulphonium and phophonium surfactants, optionally substituted by an anionic solubilising group. The proportion of surfactant, expressed as a fraction of all the surfactant present is often from $2/10$ to $8/10$ths anionic, from 0 to $6/10$ths non-ionic, and from 0 to $3/10$ths for the other surfactants.

The zeolite need not comprise the entire builder content of the composition and indeed in certain aspects need not be present at all. Such non-zeolite builders can be present within the conventional range for builders, ie from about 5 to 60%. It is essential, however, that to accord with the present invention, the sodium percarbonate is selected by virtue of passing the twin selection tests, namely the specified moisture pick-up and particle size distribution. Other detergent builders that are suitable for inclusion in compositions according to the present invention include specifically the aforementioned layered silicates, alkali metal phosphates, particularly tripolyphosphate but also tetrapyrophosphate and hexametaphosphate, especially the sodium salt of each, alkali metal, preferably, sodium carbonate, alkali metal silicates and alkali metal, preferably, sodium borates. Yet a further class of builders which can be incorporated comprises organic chelating builders such as aminopolycarboxylates and aminopolymethylenephosphonates or hydroxyphosphonates including nitrilo triacetate or trimethylene phosphonate, ethylene diamine tertraacetate or tetramethylene phosphonate, diethylenetriamine pentamethylene phosphonate or cyclohexane-1,2-diaminetetramethylene phosphonate, normally completely or partly in sodium salt form. Chelating carboxylate builders comprise monomeric and oligomeric carboxylates including glycolic acid and ether derivatives, a salts and derivatives of succinic and tartaric acid, citrates, carboxy derivatives of succinates, and polyaspartates. Others include ethane or propane tetracarboxylates and various sulphosuccinates. Such chelating builders can be employed in a relatively small amount as an augmenting builder and peroxygen stabiliser, such as of 1 to 10%. The additional builders including the chelating builders, can be present in amounts at the discretion of the producer of the composition, and in total, they represent up to not more than about 40% by weight and in many instances from about 5 to about 20% by weight.

Further and optional constituents of the detergent composition can include anti-redeposition and soil suspension agents, bleach activators, optical brightening agents, soil release agents, suds controllers, enzymes, fabric softening agents, perfumes, colours and processing aids. In total the optional constituents often comprise up to about 20% of the composition weight, and often up to 10% by weight, excluding processing aids which can additionally constitute, if desired from 0 to 30% of the composition weight.

Anti-redeposition/soil suspension agents are often selected from methyl, carboxymethyl or hydroxyethyl derivatives of cellulose , or polyvinylpyrolidones and from polycarboxylic acid polymers such as copolymers of maleic anhydride with methacrylic acid, ethylene or methylvinyl ether. At least 0.5% and often from 1 to 5% of such agent is conveniently present.

Bleach activators which can be included are usually O-acyl or N-acyl compounds which generate peroxyacid by reaction with the sodium percarbonate. Suitable classes of activators include activators a1 to a20 described in EP-A-0565017, incorporated herein by reference. Particular activators or noteworthiness include TAED, SNOBS and its isononoyl analogue, TAGU and sugar esters. Such activators, when employed, are usually employed in an equivalent mole ratio to the percarbonate of from 2:1 to 1:10, and often at or around 1:1 or 1:5 to 1:8. In many instances this can correspond to a content of between 1 and 8% and especially 2 to 6% by weight of the composition. The user can further contemplate incorporating one or manganese, cobalt or titanium complexes, otherwise called accelerators, in accordance with published literature optionally with a calcium promoter.

Optical brightening agents are often selected from appropriately substituted aminostilbenes and especially from tri-azinaminostilbenes.

Soil release agents are often selected form copolymers of terephthalic acid and polyethylene oxide and/or polypropylene oxide.

Suds suppressers are often silicones or alkylated silicone materials or finely divided aerogels or xerogels of silica.

Enzymes can be selected from amylases, neutral or alkaline proteases, lipases, esterases, and cellulases which are offered commercially.

Fabric softening agents include smectite clays and water-insoluble tertiary amines, sometimes in conjunction with long chain quaternary ammonium salts and/or high molecular weight polyethylene oxides. The total content of such agents is often selected in the range of from 5 to 15% by weight, with the organic component providing from about 0.1 to 2% by weight.

The processing aids are often selected from sodium and/or magnesium sulphate. In concentrated or ultra-concentrated compositions, they often constitute a relatively small proportion of up to about 5%, but in traditional powders, they can often constitute from 20 to 40% of the weight of the composition.

The detergent compositions of the present invention are often prepared by dry blending the particulate sodium percarbonate and sometimes a fraction of the zeolite with a preformed mixture of the remaining constituents. The mixture of the non-percarbonate/zeolite constituents can be obtained in conventional fashion by spray drying a paste of those constituents to form a particulate mixture or by agglomeration.

It will be further recognised that the benefit of selecting the sodium percarbonate by the twin tests for incorporation in built detergent compositions can apply likewise to other built compositions containing the same builders, such as for example to bleach additive compositions, which usually contain at least 5% of each of the builder and percarbonate in a weight ratio often from 5:1 to 1:5.

Detergent compositions are produced on a bulk scale, so that their constituents such as sodium percarbonate in practice need to be stored in bulk and transported to the storage/ detergent manufacture site in bulk. It is highly desirable to employ in detergent compositions, such as those described hereinbefore, sodium percarbonate which has been produced in a crystalliser or crystalliser classifier without addition of a chloride- or in many instances particularly without any salting out agent, but which produce or can be classified to produce particulate product having the desirable particle size range and distribution indicated hereinbefore. It is especially desirable to select such products which exhibit a very low rate of emission of heat. A representative figure to enable a realistic comparison between products produced using different processes and in different locations can be obtained by first subjecting the percarbonate sample to a 7 day aging process in a sealed ampoule in a constant temperature chamber held at at 40C, thereby bringing the percarbonate to substantially a plateau value for the heat emission. Such aging is indicated herein by reference to the product being 7 day aged. The product is then transferred to microcalorimeter, model LKB 2277, also called a Thermal Activity Monitor which is marketed by Thermometric Limited, Sweden. The heat is measured that is emitted from the sample over a standard period, which herein is 16 hours and at a standard test temperature which herein is 40 C. By comparison, a typical product obtained from a wet process involving chloride salting out can often emit from 5 to 7 $\mu$W/g in the 16 hour test period, whereas the invention process products usually emit less than 3 $\mu$W/g, often at least 0.5 $\mu$W/g, and in many instances from 1 to 2 $\mu$W/g. The invention products having lower heat emission can enable the sodium percarbonate to be handled and stored under more adverse conditions, such as in hotter climates or with reduced investment in precautionary means to remove heat.

It is of practical benefit to select for incorporation in detergent compositions PCS product which not only has a large particle size, preferably with narrow span below 1, and a low MPU of below 30 g/1000 g, but has a low 7 day aged LKB of below 3 $\mu$W/g.

Having described the invention in general terms, specific embodiments thereof are described in greater detail by way of example only.

In these Examples and Comparisons, the moisture pick-up and particle size distribution was measured and employed as the basis for selecting the sodium percarbonate. The data for the moisture pick-up shown was obtained by the test at 80% relative humidity and 32° C. described previously herein.

The sodium percarbonate employed in respectively Examples 1–3 was obtained by sieving a bulk sample of sodium percarbonate produced by Solvay Interox and having a low moisture-pick up through a nest of sieves having the mesh sizes as indicated below into three fractions. Likewise the sodium percarbonate employed in Comparisons R1 to R3 was obtained by sieving a differently produced sodium percarbonate have a much higher moisture pick-up through the same nest of sieves to produce three fractions. The mean particle sizes of the three pairs of corresponding fractions, 1 and R1, 2 and R2 and 3 and R3, were similar.

The sodium percarbonate of Examples 1–3 was obtained by a crystallisation method in which an aqueous bulk solution of sodium percarbonate at or near saturation was obtained by first reacting in solution hydrogen peroxide and sodium carbonate, and then introducing a chloride-free salting out agent, sodium sulphate, in order to encourage crystallisation and precipitation of the sodium percarbonate therefrom. The crystallisation process was carried out in an integrated apparatus comprising crystalliser located above and linked to a classifier. The liquor flowed upwards through the classifier and the crystalliser and a fraction recycled to the base of the classifier. The sodium sulphate salting out agent reduced the solubility of the solution of sodium percarbonate introduced into the crystalliser, thereby causing some nucleation and also deposition of percarbonate on the particles of percarbonate present in the crystalliser. As the particles grew in the crystalliser they tended to fall under the influence of gravity into the classifier below. A product comprising mainly particles of at least 400 microns diameter was withdrawn from a bottom zone of the crystalliser. By virtue of the tendency for the particles sodium percarbonate particles to fall out of the crystalliser as their size increased, rather than remain therein to further increase in size, the resultant product tended to enjoy a much tighter particle size distribution than the product of a conventional "wet" crystallisation route for making sodium percarbonate. Consequently, although the unsieved product had a mean particle size in the range of 600 to 650 microns, there were relatively few particles of above 800 microns diameter. The product was dried by hot air.

In the comparison compositions, the sodium percarbonate was obtained in a commercially operated "wet" manufacture route by Solvay Interox in which sodium percarbonate was reacted in solution with hydrogen peroxide to form a concentrated solution of sodium percarbonate, in the presence of sodium chloride as a salting out agent in solution and the mixture was cooled, thereby resulting in the formation of crystalline percarbonate. Likewise, the comparison product was dried by hot air.

In the Examples and Comparisons, the detergent composition was obtained by dry mixing 10% w/w of sodium percarbonate with 90% by weight of a base detergent composition containing zeolite A (Na) in an amount of about 30% w/w.

Samples (50 g) of the blended composition were transferred into polyethylene-coated cartons which were sealed and the cartons stored in a temperature and humidity controlled cabinet at 80° F. (26.7 C), 80% relative humidity for 6 weeks. The available oxygen content (Avox) of the composition was measured at the beginning and end of the storage period, using a standard potassium-permanganate titration method and the Avox remaining at the end expressed as a percentage of its starting value.

TABLE 1

| Ex / Comp | Particle size $\mu$ | Moisture Pick-up (g/kg) | % Avox recovery |
|---|---|---|---|
| 1 | 600–850 | 10 | 50 |
| 2 | 425–600 | 10 | 32 |
| 3 | 250–425 | 10 | 19 |
| C1 | 600–850 | 100 | 38 |
| C2 | 425–600 | 100 | 16 |
| C3 | 250–425 | 120 | 0 |

From the Table, it can be seen that by employing sodium percarbonate which intrinsically has a particle size of mean around 500 or higher in combination with a low moisture pick-up, it had a stability in the presence of zeolite builder which was significantly and measurably higher than if only one of the two parameters had been selected alone. In particular, it will be observed that the stability of percarbonate having a very similar particle size range/distribution differed markedly, even though from the disclosure of EP451893 products of the same particle size range (since neither had been coated to modify stability) would be expected to be likewise very similar; eg the product in Ex2 was twice as stable as the product in C2. The improvement in Avox retention by employing percarbonate having low as compared with high moisture pickup was consistently around 14 to 18% in the test. This can be seen by comparing samples with the same fraction of particle sizes eg Ex2 with C2, and likewise, the improvement from selecting larger particles is maintained in the range of 14 to 18% as can be seen by comparing the results from within the respective Examples Ex1, Ex2 and Ex3.

The results demonstrate clearly that the process of selecting sodium percarbonate based on the twin measurement of moisture pickup and particle size represents a practical method of selecting sodium percarbonate that is intrinsically suitable for incorporation in detergent compositions, ie the selection of the materials in Examples 1 and 2.

In a further set of tests, a sample of sodium percarbonate of the same type as that employed before sieving in Examples 1 to 3 and having a moisture pick-up of 10 g/1000 g in the relevant test was contacted with fine particulate materials contemplated as coating agents. It was found that the effect of contacting with sodium carbonate, sodium sulphate and sodium silicate, even at 5% of that material did not increase the relevant stability determinant (moisture pickup) to more than about 15 g/1000 g, but that the presence of 5% sodium chloride increased the moisture pick-up to over 100 g/1000 g confirming that preventing the presence of an excess chloride content is highly important for retaining the benefit of the inherent stability of the selected percarbonate of the invention in a subsequent coating operation.

In a further demonstration, the Avox stability was measured of samples of sodium percarbonate in particulate mixture with a detergent composition containing a particulate zeolite A (Na salt) and a layered silicate (SKS-6) as builders, the test being conducted in wax laminated boxes at 32° C. and 80% relative humidity. In trial 4, the sodium percarbonate had been produced by a method in essence like that which produced the products employed in Examples 1–3, ie an integral crystalliser/classifier using sodium sulphate salting agent, but with the operating conditions controlled to produce a product having a mean particle size of about 750 $\mu$ and a moisture pick-up of <10 g/1000 g. In test 5, a further sample of the sodium percarbonate used in test 4 was coated with a 50/50 w/w mixture of sodium carbonate and sodium sulphate by damping the particulate percarbonate with a concentrated aqueous solution of the coating agents in a laboratory scale agitated mixer at about 25–30° C. to provide a total dry weight of 3% coating agents and drying the damp percarbonate in a fluid bed drier.

In test C6 (comparative), the sodium percarbonate used was obtained by taking a conventional "wet bed" product made using a chloride salting out agent, (moisture pick-up of about 100 g/1000 g) and coating the particulate material in the same way as in the product for test 5 with a 50/50 w/w mixture of sodium carbonate and sodium sulphate (total 3% dry weight coating), the resultant material have a mean particle size of about 720 $\mu$. The Avox recovered after 6 weeks storage for the test products was respectively Test 4 43%

Test 5 65%

Test C6 32%

From the data above, it can be seen that in the presence of the zeolite/layered silicate, the uncoated percarbonate in test 4 was more stable by a significant amount than the coated product in test C6, confirming that by meeting a suitable combination of parameters in accordance with the instant invention, a product of improved stability can be obtained relative to percarbonate obtained conventionally, even of similar particle size after coating. Secondly, it can be seen that the percarbonate in test 4 was a particularly suitable base for a subsequent coating, in that the coating also further enhanced the stability of the percarbonate. Even though the coating level was the same in tests 5 and 6 the stability of the coated product meeting the particle size and moisture pick-up criteria of the invention compositions was twice as good as that of the comparison coated product.

EXAMPLE 7 AND COMPARISON 8

In this Example, the tests for particle size and moisture pick-up were conducted on two samples of sodium percarbonate which had been produced by reaction between a concentrated solution of hydrogen peroxide and sodium carbonate in bulk and precipitation therefrom in the presence of a low concentration of diphosphonic acid stabiliser, and sodium silicate, polyacrylate and pyrophosphate crystal habit modifiers, but in the absence of a salting out agent.

The moisture pick-up test was conducted in the same way as previously described herein and produced results of 14.1 and 10.7 g/kg in 24 hours storage, demonstrating that they are within the acceptable range of below 30 g/kg. The particle size distribution was obtained by sieving through a nest of standard sieves, and this showed that the mean particle size was respectively 723 and 747 $\mu$m, and that less than 7% of the particles were below 425 $\mu$m. This product passes the selection process.

By comparison in C8, the same tests were conducted on a sample of standard commercially available sodium percarbonate obtained using a conventional salting out process. This comparison picked up 122 g/kg moisture in 24 hours and had a mean particle size of 465 $\mu$m. This sample fails the selection process.

Further samples of the Example and comparison products were then mixed with reference detergent A in the weight ratio of 15%:85%, and stored in polyethylene-coated boxes in a constant temperature enclosure maintained at 32C and 80% relative humidity. The active oxygen content of the compositions was measured periodically by the standard titration method and compared with the initial measurement to determine the proportion of active oxygen which had been retained.

Detergent A contained approximately 7.5% sodium linear alkyl benzene sulphonate, 25% zeolite A, 4% ethoxylated tallow alcohol, 3% soap, 5% SIK foam inhibitor, 9% sodium carbonate, 6% sodium sulphate, and a number of detergent adjuncts including a proteyte enzyme, soil redeposition agent, optical brightener in minor amounts.

TABLE 2

|  | Avox retained after 6 weeks Detergent A |
| --- | --- |
| Example 7 | 66 |
| Comparison 8 | 18 |

From Table 2, it can be seen that sodium percarbonate selected in accordance with the twin tests demonstrated significantly superior stability.

Further testing on other zeolite-containing detergent compositions containing a bleach activator, tetraacetyl ethylenediamine (3%) confirmed that the sodium percarbonate selected in accordance with the twin tests retained its avox longer than for sodium percarbonate which did not satisfy the twin tests.

EXAMPLE 9 AND COMPARISON 10

In this Example, a further sample of sodium percarbonate was tested that had been produced by the same general method as for Example 7. In the moisture pick-up test, it picked up 7.6 g/leg in 24 hours. The particle size was measured as for Example 7 and showed a mean particle size of 716 $\mu$m, and 10% below 425 $\mu$m. Thus, this sample passed the twin tests.

Its stability in a detergent composition B was tested against a further sample of the sodium percarbonate described in Comparison 8, in a mixture of 20% sodium percarbonate to 80% base detergent, in the same way as for Example 7.

The base detergent B contained approximately 8% linear alkyl benzene sulphonate, 3% ethoxylated tallow alcohol, 3% soap, 44% sodium tripolyphosphate, 7% sodium silicate, 20% sodium sulphate, and soil antiredeposition agent and chelate in minor amounts.

TABLE 3

|  | Avox retained after 6 weeks Detergent B |
| --- | --- |
| Example 9 | 72 |
| Comparison 10 | 62 |

From Table 3, it can be seen that the benefit of selecting sodium percarbonate that intrinsically passes the twin tests is also apparent in compositions that are built with a phosphate builder, although the difference is not as great as for zeolite-built compositions.

A further sample of the sodium percarbonate described in Example 9 was coated with 3% by weight sodium carbonate/sodium sulphate (but 2:1 weight ratio) in the manner described for Example 5. The avox stability resultant product was then tested in reference detergent A in the same conditions as for Example 7. It was found that after 6 weeks storage, 70% avox had been retained, indicating that the coating had further improved the storage quality of core sodium percarbonate that intrinsically passed the twin tests.

EXAMPLES 11 TO 13

In these Examples, washing compositions are obtained by dry blending sodium percarbonate obtained by operation of a crystallisation process in which sodium percarbonate precipitated from a solution containing hydrogen peroxide and sodium carbonate in a mole ratio of 0.85:1 and into which no additional salting out-agent was introduced, the product having the properties of 7 day aged heat emission (LKB) of <3 µW/g in 16 hours, water pick-up (MPU) of 10 g/1000 g, mps (mean particle size) of 770 µ (span 1.0) bulk density (BD) 920 g/1000 g into a pre-formed mixture of the remaining constituents. The constituents and their respective proportions are summarised in Table 4 below.

In Table 4, ABS indicates sodium alkyl benzene sulphonate, AEO alcohol ethoxylate, other surfactant includes a soap, and/or a cationic surfactant, the bleach activator is tetra acetyl ethylene diamine, or sodium nonanoyl or acetyl oxybenzenesulphonate and the detergent adjuvants include one or more polycarboxylate or polyphosphonate complexing builder, one or more cellulose derivatives, PVP and/or maleic anhydride copolymers acting as soil anti redeposition agents, an aminostilbene optical brightener, colorant and perfume and optionally an amylase, protease lipase esterase or cellulase enzyme.

TABLE 4

| Example No | 11 | 12 | 13 |
|---|---|---|---|
| | Amount % w/w | | |
| anionic surfactant - ABS | 9 | 15 | 7 |
| nonionic surfactant - AEO | 4 | 3 | 3 |
| other surfactant | 9 | | 3 |
| Zeolite 4A | 28 | 20 | |
| Na tripolyphosphate | | | 37 |
| Na carbonate | 10 | 14 | |
| Sodium Percarbonate | 15 | 20 | 15 |
| Bleach Activator | | 3 | |
| Sodium Sulphate | 6 | 18 | 17 |
| Detergent adjuvants | 9 | 3 | 8 |

Similar compositions are obtainable by varying the amounts of constituents listed above, within the ranges known within the detergent industry to remain effective, and by replacing all or part of individual constituents, such as by replacing all or a fraction of the ABS with an alkyl sulphate, alcohol sulphate, sulphate glyceride or succinate or phosphate esters, and/or by replacing the AEO at least in part by an ethoxylated alkyl phenol, a PEO/PPO copolymer or fatty acid/amide polyols and/or by replacing zeolite 4A with SKS6, or MAP zeolites and/or partly with sodium silicate, and/or by replacing at least partly tripolyphosphate with sodium tetraphosphate and/or by replacing the diluent sodium sulphate with sodium chloride.

The sodium percarbonate incorporated in the compositions of each of Examples 11 to 13 respectively can be varied by employing the following percarbonate products (P1 and P2) which were obtained in a crystalliser operated without salting out agent and which intrinsically meet the parameters of low heat emission, low moisture pick-up and acceptable mean particle size.

TABLE 5

| Product Ref | P1 | P2 | P3 |
|---|---|---|---|
| MPU g/1000 g | 14 | 1.5 | 9.4 |
| LKB µW/g | 1 | 2 | 2.3 |
| MPS µm. | 680 | 650 | 950 |
| span | 1.0 | not measured | 0.9 |

TABLE 5-continued

| Product Ref | P1 | P2 | P3 |
|---|---|---|---|
| BD g/1000 g | 990 | not measured | 900 |
| Avox % | 14.7 | 14.9 | 15.0 |

Further examples of PCS (P4 to P7) which can be employed instead of products P2 or P3 comprise products made in the same apparatus under varied operating conditions, whilst still avoiding addition of a salting out agent, and which the acceptable low MPU (<30 g/1000 g) and low 7 day aged LKB of <3 µW/g in 16 hours and the other physical characteristics listed below in

TABLE 6

| Product Ref | P4 | P5 | P6 | P7 |
|---|---|---|---|---|
| MPS µm. | 680 | 770 | 840 | 700 |
| span | 1.1 | 1.2 | 1.0 | 1.2 |
| BD g/1000 g | 930 | 920 | 920 | 860 |
| Avox % | 15.0 | 14.8 | 15.0 | 14.4 |

The PCS can be further varied by employing such products which are intrinsically acceptable as the core for a coating, for example in an amount of from 2 to 5% w/w (particularly 3%) of sodium sulphate/carbonate, sodium borate/silicate, or coating agents contacted in acid form such as a mixture of boric acid with neutral salts such as sodium sulphate and/or chloride and optionally a carboxylic acid and/or hydroxycarboxylic acid capable of forming a complex with an oxy-boron compound, or especially using mother liquor containing added sodium sulphate to a mole ratio of $Na_2CO_3:Na_2SO_4$ of from 1:2 to 2:1.

The compositions will demonstrate varied rates of decomposition of the sodium percarbonate, but all will enjoy the benefit of employing the readily bulk storable PCS and the stability offered by a large particle size in comparison with the use of PCS that does not meet either or both of the twin features of low heat emission and large particle size.

What is claimed is:

1. Sodium percarbonate intrinsically having a mean particle size of from 500 to 1200 microns and no more than 20% by weight of a particle size below 350 microns and a moisture pick-up when measured in a test at 80% relative humidity and 32° C. after 24 hours of not greater than 30 g/1000 g sample.

2. A sodium percarbonate according to claim 1 intrinsically having a mean particle size of from 500 to 850 microns.

3. A sodium percarbonate according to claim 1 intrinsically having a moisture pick-up of not more than 15 g/1000 g when measured in said test.

4. A sodium percarbonate according to claim 1 being coated with a layer of from 1 to 20% by weight of an inorganic and/or organic coating.

5. A sodium percarbonate according to claim 4 wherein the coating layer comprises no more than 2.5% by weight chloride calculated as NaCl based on the sodium percarbonate.

6. A sodium percarbonate according to claim 1 obtained by crystallization from a halide-restricted saturated aqueous solution.

7. A sodium percarbonate according to claim 6 is obtained by crystallization from solution by addition of a non-halide sodium salting agent.

8. A sodium percarbonate according to claim 6 obtained by crystallization from solution in the absence of a salting agent.

9. A sodium percarbonate according to claim 6 classified to remove undersize and oversize particles and retain a product having the particle size characteristics of claim 1.

10. A sodium percarbonate according to claim 9 wherein the crystallization and classification of the sodium percarbonate occur in a classifying crystallizer.

11. A sodium percarbonate according to claim 1 having a 7 day aged heat emission at 40° C. of below 3 $\mu$W/g in 16 hours.

12. A sodium percarbonate according to claim 1 having an Avox of at least 14.5%.

13. A sodium percarbonate according to claim 1 having a bulk density of 800 to 1000 g/1000 cm$^3$.

14. A detergent composition comprising a builder and sodium percarbonate according to claim 1.

15. A detergent composition according to claim 14 comprising from 2 to 40% by weight sodium percarbonate.

16. A detergent composition according to claim 14 comprising from 5 to 60% builder.

17. A detergent composition according to claim 14 comprising at least one activator which reacts in aqueous solution with sodium percarbonate to generate a peroxyacid.

18. A detergent composition according to claim 14 wherein said builder comprises a zeolite builder.

19. A detergent composition according to claim 14 containing a phosphate builder.

20. A method of selecting sodium percarbonate for incorporation in a builder-containing composition comprising:

1) measuring particle size distribution of said sodium percarbonate, determining its mean particle size and the weight fraction below 350 microns, and rejecting material having either a mean particle size outside the range of from 500 to 1200 microns or containing more than 20% by weight of particles having a size below 350 microns; and 2) measuring the extent to which moisture is picked up by the material in a test conducted for 24 hours at 32° C. and 80% relative humidity and rejecting material which picks up more than 30 g moisture per 1000 g material.

* * * * *